United States Patent
Anshel et al.

(10) Patent No.: US 10,367,640 B2
(45) Date of Patent: Jul. 30, 2019

(54) SHARED SECRET DATA PRODUCTION SYSTEM

(71) Applicant: SECURERF CORPORATION, Shelton, CT (US)

(72) Inventors: Iris Anshel, Tenafly, NJ (US); Dorian Goldfeld, Tenafly, NJ (US)

(73) Assignee: SecureRF Corporation, Shelton, CT (US)

( * ) Notice: Subject to any disclaimer, the term of this patent is extended or adjusted under 35 U.S.C. 154(b) by 322 days.

(21) Appl. No.: 15/585,654

(22) Filed: May 3, 2017

(65) Prior Publication Data

US 2017/0324548 A1    Nov. 9, 2017

Related U.S. Application Data

(60) Provisional application No. 62/331,632, filed on May 4, 2016.

(51) Int. Cl.
| | |
|---|---|
| *H04L 9/30* | (2006.01) |
| *H04L 9/14* | (2006.01) |
| *H04L 29/06* | (2006.01) |
| *H04L 9/08* | (2006.01) |

(52) U.S. Cl.
CPC .......... *H04L 9/3066* (2013.01); *H04L 9/0844* (2013.01); *H04L 9/14* (2013.01); *H04L 63/061* (2013.01)

(58) Field of Classification Search
CPC ... H04L 9/0816; H04L 9/0819; H04L 9/0825; H04L 9/0838–0844; H04L 9/0847; H04L 9/0861; H04L 9/14–16; H04L 9/3066–3073; H04L 63/06–061
See application file for complete search history.

(56) References Cited

U.S. PATENT DOCUMENTS

| | | | | |
|---|---|---|---|---|
| 2002/0001382 | A1* | 1/2002 | Anshel | H04L 9/0841 380/30 |
| 2004/0240672 | A1* | 12/2004 | Girault | H04L 9/3066 380/277 |
| 2019/0097982 | A1* | 3/2019 | Bhattacharyya | H04L 63/0435 |

\* cited by examiner

*Primary Examiner* — Kevin Bechtel
(74) *Attorney, Agent, or Firm* — Moritt Hock & Hamroff LLP; Bret P. Shapiro

(57) ABSTRACT

Systems and methods for producing shared secret data are generally described. A first device may receive a public key from a second device. The public key may be based on a first secret element. The first device may generate a first ephemeral private key based on a second secret element, and may generate a second ephemeral private key based on a third secret element. The first device may generate a first element based on the public key and the first ephemeral private key, and may generate a second element based on the public key and the second ephemeral private key. The second element may relate to the shared secret data. The first device may generate a session public key based on the first element, the second secret element, and the third secret element. The shared secret data may be derivable, by the second device, from the session public key.

20 Claims, 4 Drawing Sheets

US 10,367,640 B2

SHARED SECRET DATA PRODUCTION SYSTEM

CROSS-REFERENCE TO RELATED APPLICATIONS

This application claims priority under 35 U.S.C. § 119(e) to U.S. Provisional Application No. 62/331,632, titled SHARED SECRET DATA PRODUCTION SYSTEM, filed on May 4, 2016. The disclosure of the provisional application is hereby incorporated by reference in its entirety.

BACKGROUND OF THE INVENTION

In some examples, a first device and a second device may exchange messages privately without knowledge from a third device. A secret key may be provided to the first device and to the second device, where the secret key may be used to encrypt and/or decrypt messages exchanged between the first device and the second device. If the third device does not have possession of the secret key, it may be difficult for the third device to obtain the messages exchanged between the first device and the second device. However, if the third device does obtain the secret key, the messages exchanged between the first device and the second device may be obtainable to the third device.

SUMMARY OF THE INVENTION

In some examples, methods for producing shared secret data between a first device and a second device are generally described. The methods may include receiving, by a receiver of the first device, key generation data that may be effective to indicate a braid group, a first set of conjugates included in the braid group, a non-singular matrix, and a set of invertible elements among a finite field. The methods may further include storing, by the receiver of the first device, the key generation data in a memory of the first device. The methods may further include receiving, by the receiver of a first device, a public key from the second device. The public key may be based on a first secret element, a first monoid element, and a first permutation associated with a first expression in a second set of conjugates included in the braid group, where the second set of conjugates commutes with the first set of conjugates. The methods may further include sending, by the receiver of the first device, the public key to an algebraic eraser module of the first device. The methods may further include retrieving, by an algebraic eraser module of the first device, a first portion of the key generation data stored in the memory. The first portion of the key generation data may indicate a second expression in the first set of conjugates. The methods may further include generating, by the algebraic eraser module of the first device, a first ephemeral private key based on a second secret element, the second expression in the first set of conjugates, and a second permutation associated with the second expression in the first set of conjugates. The first ephemeral private key may be based on the second secret element, a second monoid element, and the second permutation. The methods may further include retrieving, by the algebraic eraser module of the first device, a second portion of the key generation data stored in the memory. The second portion of the key generation data indicates a third expression in the first set of conjugates. The methods may further include generating, by the algebraic eraser module of the first device, a second ephemeral private key based on a third secret element, the third expression in the first set of conjugates, and the second permutation associated with the third expression in the first set of conjugates. The second ephemeral private key may be based on the third secret element, a third monoid element, and the second permutation. The methods may further include storing, by the algebraic eraser module of the first device, the first ephemeral private key in the memory of the first device. The methods may further include storing, by the algebraic eraser module of the first device, the second ephemeral private key in the memory of the first device. The methods may further include sending, by the algebraic eraser module of the first device, the first ephemeral private key to a session key generator of the first device. The methods may further include sending, by the algebraic eraser module of the first device, the second ephemeral private key to the session key generator of the first device. The methods may further include generating, by the session key generator first device, a first element based on the public key from the second device, and based on the first ephemeral private key. The methods may further include generating, by the session key generator the first device, a second element based on the public key from the second device, and based on the second ephemeral private key. The second element may relate to the shared secret data. The methods may further include generating, by the session key generator of the first device, a session public key based on the first element, the second secret element, the third secret element, the second monoid element, and the third monoid element. The shared secret data may be derivable from the session public key.

In some examples, systems effective to produce shared secret data are generally described. The systems may include a first device and a second device. The first device may include a first memory. The second device may include a second memory. The first device may be configured to receive key generation data from a third device. The key generation data may be effective to indicate a braid group, a first set of conjugates included in the braid group, a non-singular matrix, and a set of invertible elements among a finite field. The first device may be further configured to store the key generation data in the first memory. The second device may be configured to receive a first secret element from the third device. The second device may be further configured to receive a public key from the third device. The public key may be based on the first secret element, a first monoid element, and a first permutation associated with a first expression in a second set of conjugates included in the braid group, where the second set of conjugates commutes with the first set of conjugates. The second device may be further configured to store the first secret element in the second memory of the second device. The second device may be further configured to send the public key to the first device. The first device may be further configured to generate a first ephemeral private key based on a second secret element, a second expression in the first set of conjugates, and a second permutation associated with the second expression in the first set of conjugates. The first ephemeral private key may be based on the second secret element, a second monoid element, and the second permutation. The first device may be further configured to generate a second ephemeral private key based on a third secret element, a third expression in the first set of conjugates, and the second permutation associated with the third expression in the first set of conjugates. The second ephemeral private key may be based on the third secret element, a third monoid element, and the second permutation. The first device may be further configured to store the first ephemeral private key in the first memory of the first device. The first device may be further configured to store the second ephemeral private key in the first memory of the first device. The first device may be further configured to generate a first element based on the public key received from the second device, and based on the first ephemeral private key. The first device may be further configured to generate a second element based on the public key received from the second device, and based on the second ephemeral private key. The second element relates to the shared secret data. The first device may be further configured to generate a session public key based on the first element, the second secret element, the third secret element, the second monoid element, and the third monoid element. The session public key may be specified for one or more communication sessions between the first device and the second device. The first device may be further configured to send the session public key to the second device. The second device may be further configured to receive the session public key from the first device. The second device may be further configured to determine the second element based on the first secret element and the session public key to produce the shared secret data.

In some examples, devices effective to produce shared secret data are generally described. A first device may include a memory, a receiver configured to be in communication with the memory, an algebraic eraser module configured to be in communication with the memory and the receiver, and a session key generator configured to be in communication with the memory, the receiver, and the algebraic eraser module. The receiver may be configured to receive key generation data from a third device. The receiver may be further configured to store the key generation data in the memory. The key generation data may be effective to indicate a braid group, a first set of conjugates included in the braid group, a non-singular matrix, and a set of invertible elements among a finite field. The receiver may be further configured to receive a public key from a second device. The public key may be based on a first secret element, a first monoid element, and a first permutation associated with a first expression in a second set of conjugates included in the braid group, where the second set of conjugates commutes with the first set of conjugates. The receiver may be further configured to send the received public key to the algebraic eraser module. The algebraic eraser module may be configured to retrieve a first portion of the key generation data stored in the memory. The first portion of the key generation data indicates a second expression in the first set of conjugates. The algebraic eraser module may be further configured to generate a first ephemeral private key based on a second secret element, the second expression in the first set of conjugates, and a second permutation associated with the second expression in the first set of conjugates. The first ephemeral private key may be based on the second secret element, a second monoid element, and the second permutation. The algebraic eraser module may be further configured to retrieve a second portion of the key generation data stored in the memory. The second portion of the key generation data may indicate a third expression in the first set of conjugates. The algebraic eraser module may be further configured to generate a second ephemeral private key based on a third secret element, the third expression in the first set of conjugates, and the second permutation associated with the third expression in the first set of conjugates. The second ephemeral private key may be based on the third secret element, a third monoid element, and the second permutation. The algebraic eraser module may be further configured to store the first ephemeral private key in the memory of the first device. The algebraic eraser module may be further configured to store the second ephemeral private key in the memory of the first device. The algebraic eraser module may be further configured to send the first ephemeral private key to the session key generator. The algebraic eraser module may be further configured to send the second ephemeral private key to the session key generator. The session key generator may be configured to generate a first element based on the public key received from the second device, and based on the first ephemeral private key. The session key generator may be further configured to generate a second element based on the public key received from the second device, and based on the second ephemeral private key. The second element may relate to the shared secret data. The session key generator may be further configured to generate a session public key based on the first element, the second secret element, the third secret element, the second monoid element, and the third monoid element. The shared secret data may be derivable from the session public key.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
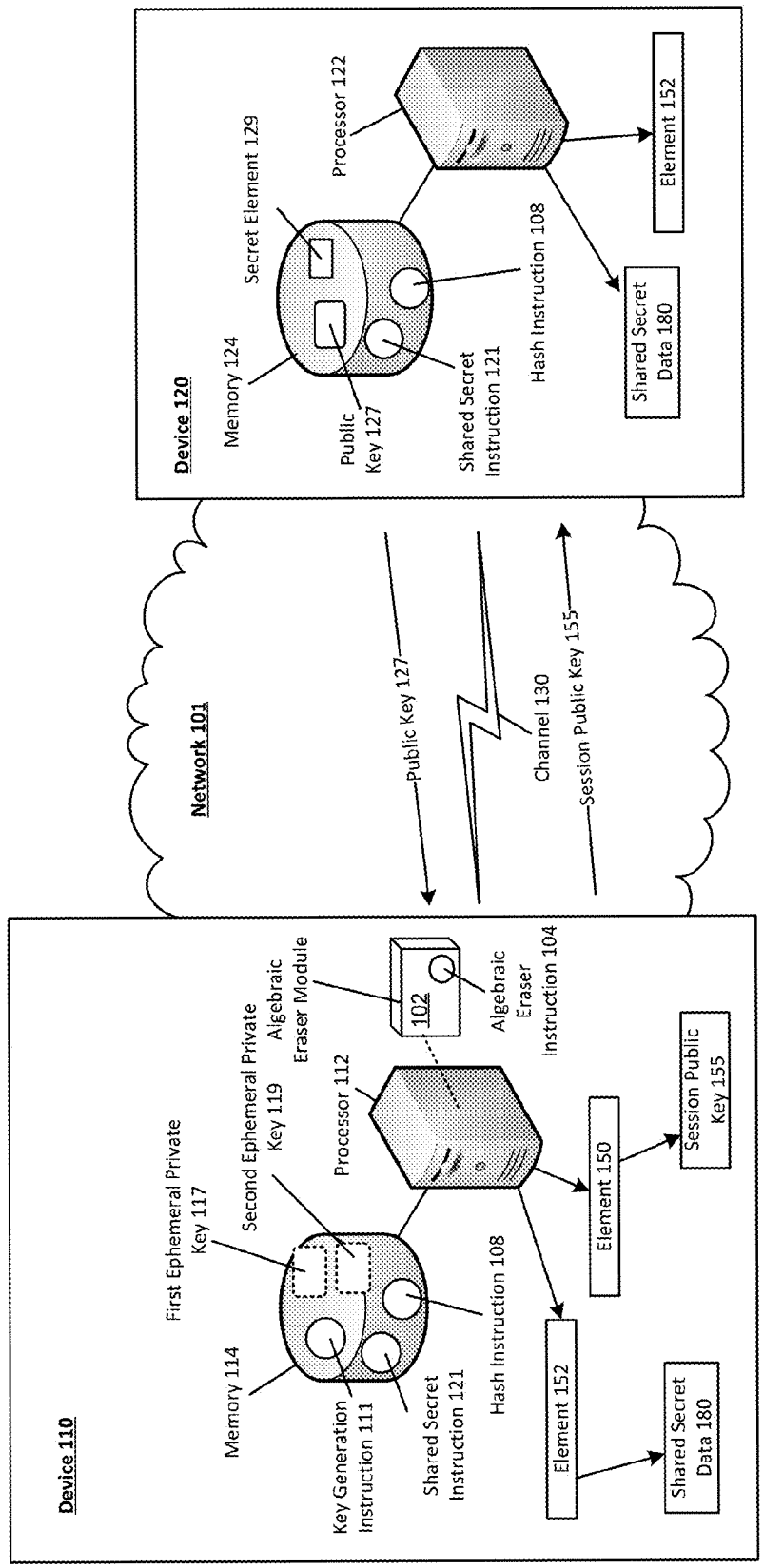
FIG. 1 illustrates a system drawing of a shared secret data production system.

all arranged according to at least some embodiments described herein.

DETAILED DESCRIPTION OF THE PREFERRED EMBODIMENT(S)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 illustrates a system drawing of a shared secret data production system, arranged in accordance with at least some embodiments described herein. An example system 100 may be effective to implement a meta key agreement and authentication protocol (MKAAP). System 100 may include at least a device 110 and/or a device 120. In some examples, devices 110, 120 may each be a computing device such as a personal computer, a laptop computer, a mobile device, a cellular phone, a tablet computer, a wearable device, a radio frequency transmitter or receiver, etc. In some examples, device 120 may be a sensor, a radio frequency identification (RF-ID) receiver, etc. Device 110 and device 120 may be configured to be in communication with each other through a network 101. Network 101 may be a wireless network, a wired network, the Internet, a cellular network, a near field communication (NFC) network, a radio frequency identification (RF-ID) network, a cloud computing environment, etc. In some examples, device 110 and device 120 may communicate with each other through a channel 130, where channel 130 may be a public channel, or an open communication channel, within network 101. In some examples, devices 110, 120 may each be controlled by a respective user.

Device 110 may include a processor 112 and/or a memory 114, where processor 112 and memory 114 may be configured to be in communication with each other. Device 110 may further include one or more modules configured to perform operations related to an implementation of system 100. Each module of device 110 may be a piece of hardware component such as a microprocessor, microcontroller, arithmetic logic unit, programmable circuit such as field programmable logic array, system on chip, etc. For example, device 110 may further include an algebraic eraser module 102, where algebraic eraser module 102 may include an algebraic eraser instruction 104. In some examples, processor 112 may control operations of algebraic eraser module 102.

Memory 114 may be configured to store data and one or more instructions. In an example, memory 114 may be configured to store a hash instruction 108, a key generation instruction 111, and a shared secret instruction 121. In some examples, memory 114 may include one or more layers of memory where each layer may correspond to respective level of security. For example, memory 114 may include a secured layer, such that data and instructions stored in the secured layer of memory 114 may not be easily accessible to devices different from device 110.

Device 120 may include a processor 122 and/or a memory 124, where processor 122 and memory 124 may be configured to be in communication with each other. Memory 124 may be configured to store data and one or more instructions. In an example, memory 114 may be configured to store hash instruction 108 and shared secret instruction 121. In some examples, memory 124 may include one or more layers or memory where each layer may correspond to respective level of security. For example, memory 124 may include a secured layer, such that data and instructions stored in the secured layer of memory 124 may not be easily accessible to devices different from device 120.

As will be described in more detail below, device 120 may send a public key 127 to device 110 through a channel 130 of network 101. Public key 127 may be derived from, at least, a secret element 129, where secret element 129 may include a matrix, and where secret element 129 may be a private key of device 120. Device 110 may determine an element 150 and an element 152 based on public key 127, a first ephemeral private key 117, and a second ephemeral private key 119 (further described below). Element 150 may be a vector denoted as $V_1$, and element 152 may be a vector denoted as $V_2$. Device 110 may generate a session public key 155 based on element 150, where session public key 155 may be a key specified for an ephemeral communication session between device 110 and device 120. Device 110 may send session public key 155 to device 120 through channel 130. Device 120 may derive, or determine, element 152 based on session public key 155 and secret element 129. Device 110 and device 120 may each execute a hash instruction 108 to apply a cryptographic hash function on element 152, where the application of the cryptographic hash function on element 152 may produce shared secret data 180. In some examples, shared secret data 180 may include one or more secret messages shared among device 110 and device 120, where shared secret data 180 may be inaccessible to devices different from device 110 and device 120.

In some examples, element 152 ($V_2$) may be a shared secret among device 110 and device 120. In some examples, shared secret data 180 may include a shared secret obtained through the exchange of session public key 155 between device 110 and device 120, where the shared secret may be used by device 110 and device 120 for subsequent communication sessions. For example, shared secret data 180 may include a shared secret that may be used to encrypt messages to be transmitted between device 110 and device 120 in subsequent communication sessions. In some examples, shared secret data 180 may include information relating to device 110 and device 120, such that device 110 and device 120 may use shared secret data 180 to authenticate each other.

Algebraic eraser module 102 of device 110 may be configured to execute algebraic eraser instruction 104, which may be stored in algebraic eraser module 102 and/or memory 114. Algebraic eraser instruction 104 may include protocols relating to a one-way function that may be computable but difficult, perhaps infeasible, to reverse. In an example, algebraic eraser instruction 104 may include a protocol relating to a one-way function referred herein as E-multiplication, or E-function, that may be defined as:

$$E((N_0,s_0),(M,s))=(N_0,s_0)*(M,s)=(N_0 \cdot \Pi(^{s_0}M),s_0 s),$$

where * denotes the E-function operator, S denotes a group acting on a left side of a monoid $\mathcal{M}$, and N denotes a group that may be a vector space, $\Pi$ denotes a function that may be a monoid homomorphism from $\mathcal{M}$ to N, also denoted as $\Pi: \mathcal{M} \to N$, which may enable a one-way function such as the E-function. The group N may be specified as the group of n×n matrices over a finite field $F_q$, and the function $\Pi: \mathcal{M} \to N$ may be specified by a collection of n invertible elements in $F_q$, termed T-values, such that the function $\Pi$ may evaluate every $M \in \mathcal{M}$ at the specified T-values. The E-function may satisfy the following identity:

$$E((n,s),((m_1,s_1)\cdot(m_2,s_2)))=E(E((n,s),(m_1,s_1)),(m_2,s_2)).$$

The monoid $\mathcal{M}$ may be a group of n×n matrices with n-variable Laurent polynomial entries, and the group S may be a group of permutations on n symbols. When S acts on n-variable Laurent polynomials, and further acts on the monoid $\mathcal{M}$, a semi-direct product, $\mathcal{M} \rtimes S$, may be formed.

The E-function may be based on the semi-direct product $\mathcal{M} \rtimes S$, where the semi-direct product may be based on a n-strand braid group $B_n$ with Artin generators, $\{b_1, b_2, \ldots, b_{n-1}\}$, and $B_n$ may be subject to the following identities:

$$b_i b_{i+1} b_i = b_{i+1} b_i b_{i+1}, (i=1,\ldots,n-1),$$

and $$b_i b_j = b_j b_i, (i,j \text{ with } |i-j| \geq 2).$$

The semi-direct product $\mathcal{M} \rtimes S$, algebraic eraser module 102 may determine a function $\varphi: B_n \to \mathcal{M} \rtimes S$, where each generator $b_i$ may be associated with a permutation $\sigma_i$ which maps i→i+1, i+1→i, and leaves $$\{1, \ldots, i-1, i+2, \ldots, n\}$$

fixed, and an element $\beta = b_{i_1}^{\in_1} b_{i_2}^{\in_2} \ldots b_{i_k}^{\in_k} \in G$, ($i_j \in \{1, \ldots, n-1\}$, and $\in_j = \pm 1$), is associated with the product of the permutations $\sigma_\beta = \sigma_{i_1} \cdot \sigma_{i_2} \ldots \sigma_{i_k}$. Associated to each $b_i$ is an ordered pair of a n×n colored Burau matrix $CB(b_i)$, whose entries are polynomials in the N variables $\{t_1, t_2, t_n\}$, together with the permutation $\sigma_i$. These ordered pairs may form the semi-direct product $\mathcal{M} \rtimes S$, and allow for the function $\varphi: B_n \to \mathcal{M} \rtimes$, to be defined as:

$$\varphi(\beta) = (CB(\beta), \sigma_\beta).$$

When n=4, the matrices $CB(b_1)$, $CB(b_2)$, and $CB(b_3)$ may be defined as follows (the general case is entirely analogous):

$$\begin{pmatrix} -t_1 & 1 & 0 & 0 \\ 0 & 1 & 0 & 0 \\ 0 & 0 & 1 & 0 \\ 0 & 0 & 0 & 1 \end{pmatrix}, \begin{pmatrix} 1 & 0 & 0 & 0 \\ t_2 & -t_2 & 1 & 0 \\ 0 & 0 & 1 & 0 \\ 0 & 0 & 0 & 1 \end{pmatrix}, \begin{pmatrix} 1 & 0 & 0 & 0 \\ 0 & 1 & 0 & 0 \\ 0 & t_3 & -t_3 & 1 \\ 0 & 0 & 0 & 1 \end{pmatrix}.$$

When n=4, with the general case being entirely analogous, $CB(b_1^{-1})$, $CB(b_2^{-1})$, and $CB(b_3^{-1})$ may be given by the following matrices, respectively:

$$\begin{pmatrix} -\frac{1}{t_2} & \frac{1}{t_2} & 0 & 0 \\ 0 & 1 & 0 & 0 \\ 0 & 0 & 1 & 0 \\ 0 & 0 & 0 & 1 \end{pmatrix}, \begin{pmatrix} 1 & 1 & 0 & 0 \\ 1 & -\frac{1}{t_3} & \frac{1}{t_3} & 0 \\ 0 & 0 & 1 & 0 \\ 0 & 0 & 0 & 1 \end{pmatrix}, \begin{pmatrix} 1 & 1 & 0 & 0 \\ 0 & 1 & 0 & 0 \\ 0 & 1 & -\frac{1}{t_4} & \frac{1}{t_4} \\ 0 & 0 & 0 & 1 \end{pmatrix}.$$

As will be described in more detail below, in response to generation of element 150 and element 152, device 110 may generate session public key 155 based on element 150, where session public key 155 may include an indication of element 150. Device 110 may send session public key 155 to device 120. Device 120 may receive session public key 155 and, in response, may determine element 152 based on secret element 129 (further described below) and session public key 155. Based on the generation of element 152 by device 110, and the determination of element 152 by device 120, both device 110 and device 120 may be in possession of element 152. In some implementations, device 110 and device 120 may each apply hash instruction 108 on element 152 to produce shared secret data 180.

Figure 2:
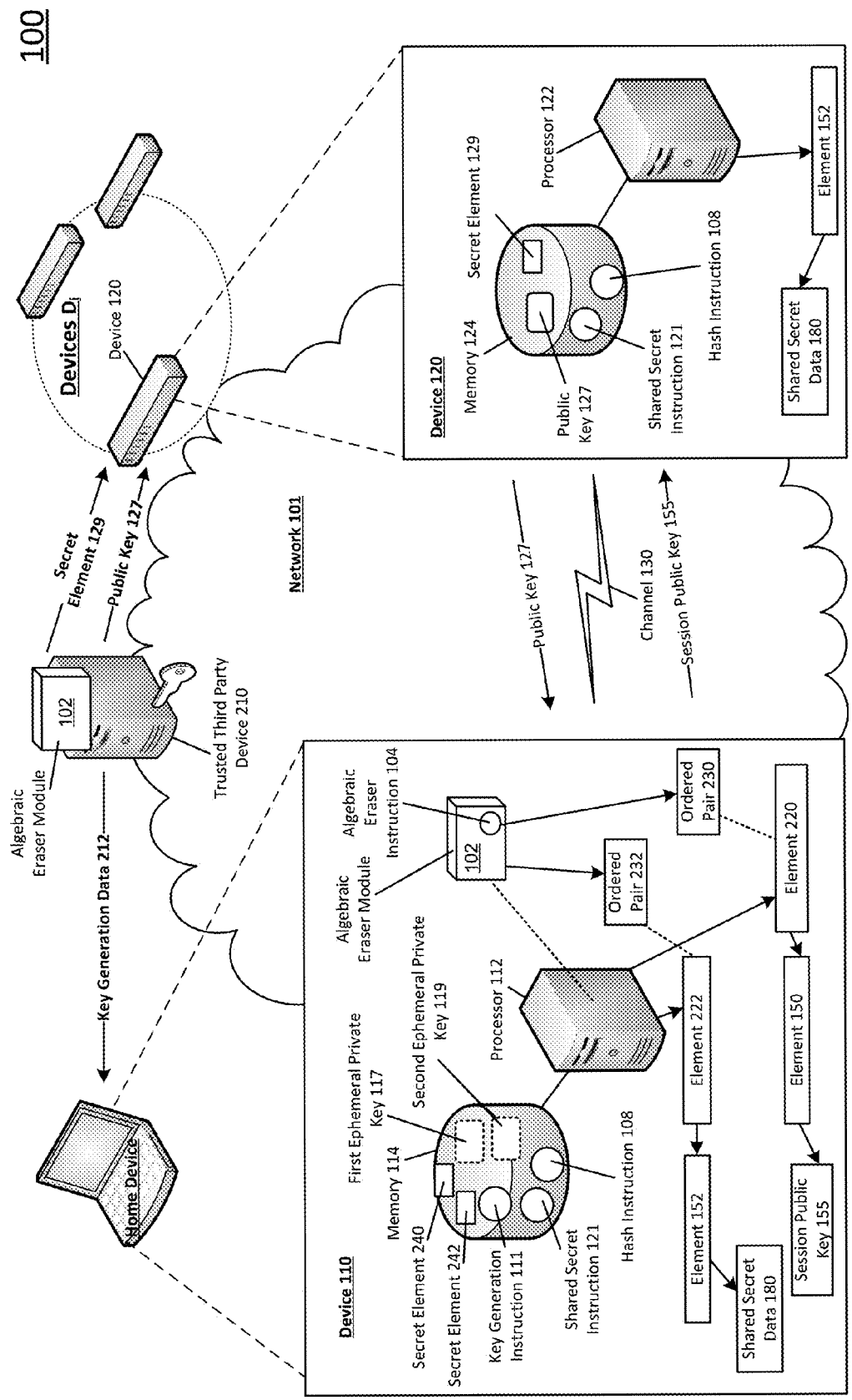
FIG. 2 illustrates an example to produce shared secret data by implementation of a shared secret data production system.

FIG. 2 illustrates an example to produce shared secret data by implementation of a shared secret data production system, arranged in accordance with at least some embodiments described herein. The process in FIG. 2 could be implemented using, for example, system 100 discussed above. Those components in FIG. 2 that are labelled identically to components of FIG. 1 will not be described again for the purposes of clarity.

In the example shown in FIG. 2, device 120 may be a device among one or more devices configured to be in communication with a trusted third party device 210. Trusted third party device 210 may be a processor, or a server of a data center, that includes algebraic eraser module 102 configured to execute algebraic eraser instruction 104. Trusted third party device 210 may be configured to be in communication with devices 110, 120, through network 101.

In an example, a home device (HD) and a collection of devices ($D_i$, i=1, 2, . . . , n) may be configured to be in communication with each other, and with trusted third party device 210, through network 101. The home device and the collection of devices $D_i$ may communicate over a public channel. In the example shown in FIG. 2, device 110 may be the home device, device 120 may be a device among the collection of devices $D_i$, and channel 130 may be the public channel. The collection of devices $D_i$ may include secret data, where the secret data may be provided by a trusted third party. In the example shown in FIG. 2, trusted third party device 210 may be associated with the trusted third party providing the secret data to devices $D_i$.

In the example shown in FIG. 2, trusted third party device 210 may send key generation data 212 to device 110. Key generation data 212 may include public information, such as data or information available to devices connected to network 101. Key generation data 212 may include data indicating the braid group $B_n$ for a fixed even integer n, a finite field $F_q$ of q elements, a non-singular matrix $m_0$ among a general linear group $GL(n, F_q)$ (such that $m_0 \in GL(n, F_q)$), a set of braid elements, $\alpha_i$, i=1, 2, . . . , r, and a fixed braid element z. Trusted third party device 210 may determine a first set of conjugates $$\{z\alpha_1 z^{-1}, z\alpha_2 z^{-1}, \ldots, z\alpha_r z^{-1}\},$$

based on the set of braid elements, $\alpha_i$, i=1, 2, . . . , r, and the fixed braid element z, where the first set of conjugates may be included in the braid group $B_n$, and may be included in key generation data 212. Device 110 may store the set of conjugates in memory 114. Key generation data 212 may further include a set of T-values. Device 110 may store the set of T-values in a secured layer memory 114 such that the set of T-values may not be accessible or available to devices $D_i$ or other devices different from device 110.

Trusted third party device 210 may determine a second set of conjugates $$\{z\gamma_1 z^{-1}, z\gamma_2 z^{-1}, \ldots, z\gamma_r z^{-1}\},$$

based on a set of braid elements, $\gamma_i$, i=1, 2, . . . , r, and the fixed braid element z, where each $\gamma_i$ commutes with every $\alpha_i$. The second set of conjugates may be included in the braid group $B_n$. Trusted third party device 210 may use the second set of conjugates to generate public key 127 and secret element 129 for device 120.

Trusted third party device 210 may generate public key 127 for device 120 based on an expression in the second set of conjugates $\{z\gamma_1 z^{-1}, z\gamma_2 z^{-1}, \ldots z\gamma_r z^{-1}\}$, denoted $\beta_D$, and a permutation (denoted $\sigma_D$) associated with $\beta_D$. Trusted third party device 210 may determine secret element 129 ($C_D$) based on a linear combination of powers of the non-singular matrix $m_0$, such that:

$$C_D = \sum_{k=0}^{n-1} c_{D,k} m_0^k \quad (c_k \in F_q),$$

where $c_k$ denote elements among the finite field $F_q$. Algebraic eraser module 102, of trusted third party device 210, may execute algebraic eraser instruction 104 to produce public key 127. For example, algebraic eraser module 102, of trusted third party device 210, may apply E-multiplication on secret element 129 ($C_D$), an identity permutation, the expression $\beta_D$ in the second set of conjugates, and the permutation $\sigma_D$ associated with the expression $\beta_D$, such that:

Public key 127 = $(C_D, id) * (\beta_D, \sigma_D) = (C_D M_D, \sigma_D)$, where id denotes the identity permutation, and $M_D$ denotes a matrix that may be an element of the monoid $\mathcal{M}$. The pair $(C_D M_D, \sigma_D)$ may serve as public key 127 for device 120. In some examples, secret element 129 may be a matrix. Trusted third party device 210 may send public key 127 and secret element 129 to device 120. Trusted third party device 210 may send public key 127 and secret element 129 to device 120 separately, such as at respective transmission sessions and/or respective times. In some examples, trusted third party device 210 may send public key 127 and secret element 129 to device 120 using two different channels among network 101. Trusted third party device 210 may send public key 127 and secret element 129 to device 120 through a private channel, such that device 110 and/or other devices D different from device 120 may not obtain secret element 129. Device 120 may receive secret element 129 from trusted third party device 210, and may store secret element 129 in a secured layer of memory 124. Device 120 may also receive public key 127 from trusted third party device 210, and may store public key 127 in memory 124. In some examples, public key 127 may be digitally signed by trusted third party device 210, and may be placed in a certificate, which may be stored in memory 124 of device 120.

Device 120 may send public key 127 to device 110 through channel 130. Device 110 may receive public key 127 as an ordered pair $(C_D M_D, \sigma_D)$, where values or elements of secret element 129 $(C_D)$ may be unknown, or unobtainable, to device 110. Device 110 may execute key generation instruction 111, such as by applying key generation instruction 111 on the T-values stored in memory 114, to construct first ephemeral private key 117 and second ephemeral private key 119. In some examples, first ephemeral private key 117 and second ephemeral private key 119 may be ephemeral. In some examples, first ephemeral private key 117 and second ephemeral private key 119 may be specified for a particular communication session between device 110 and device 120, such as the communication session began when device 120 sent public key 127 to device 110. In some examples, first ephemeral private key 117 and second ephemeral private key 119 may be specified for more than one communication sessions between device 110 and device 120. In some examples, first ephemeral private key 117 and second ephemeral private key 119 may be specified for a period of time. For example, device 110 may send session public key 155 to device 120 at a sending time. Processor 112 may execute a counter, that may be a component of device 110, to determine a lapse of time that begins at the sending time. A threshold, such as ten minutes, may be indicated by shared secret data instruction 121. When the lapse of time is equal to, or greater than, the threshold, processor 112 may remove, or delete, first ephemeral private key 117 and second ephemeral private key 119 from memory 114. In some examples, the threshold may be indicated as a number of communication sessions, such as five sessions. Processor 112 may similarly determine a number of communication sessions attempted between device 110 and device 120. When the number of communication sessions is equal to, or greater than, the threshold, processor 112 may remove, or delete, first ephemeral private key 117 and second ephemeral private key 119 from memory 114.

To generate first ephemeral private key 117 and second ephemeral private key 119, device 110 may determine a secret element 240 (denoted as C), and may determine a secret element 242 (denoted as C'), based on linear combinations of powers of the non-singular matrix $m_0$:

$$C = \sum_{k=0}^{n-1} c_k m_0^k, C' = \sum_{k=0}^{n-1} c'_k m_0^k \quad (c_k \in F_q).$$

In some examples, secret element 240, 242, may each be a matrix. Device 110 may store secret elements 240, 242, in a secured layer of memory 114. Processor 112 of device 110 may generate first ephemeral private key 117 based on an ephemeral expression $\beta$ in the first set of conjugates $\{z\alpha_1 z^{-1}, z\alpha_2 z^{-1}, \ldots, z\alpha_r z^{-1}\}$. Similarly, processor 112 of device 110 may generate second ephemeral private key 119 based on an ephemeral expression $\beta'$ in the first set of conjugates $\{z\alpha_1 z^{-1}, z\alpha_2 z^{-1}, \ldots, z\alpha_r z^{-1}\}$. The ephemeral expressions, $\beta, \beta'$ in the first set of conjugates $\{z\alpha_1 z^{-1}, z\alpha_2 z^{-1}, \ldots, z\alpha_r z^{-1}\}$, may have the property that the permutations associated to $\beta$ and $\beta'$ coincide with the permutation $\sigma$. The property may be accomplished by producing expressions in the first set of conjugates $\{z\alpha_1 z^{-1}, z\alpha_2 z^{-1}, \ldots, z\alpha_r z^{-1}\}$ with trivial permutations. The first set of conjugates, transmitted from trusted third party device 210 to device 110, may include conjugates with trivial permutation.

Algebraic eraser module 102, of device 110, may execute algebraic eraser instruction 104 to produce first ephemeral private key 117 and second private ephemeral key 119. For example, algebraic eraser module 102, of device 110, may apply E-multiplication on secret element 240 (C), an identity permutation, the expression $\beta$ in the first set of conjugates, and a permutation a associated with $\beta$, such that:

$(C, id) * ((\beta, \sigma)) = (C M, \sigma)$

By applying E-multiplication on the pairs (C', id) and $(\beta, \sigma)$, an ordered pair (C'M', $\sigma$), may be generated and may serve as first ephemeral private key 117 for device 110. Similarly, algebraic eraser module 102, of device 110, may apply E-multiplication on secret element 242 (C'), an identity permutation, the expression $\beta'$ in the first set of conjugates, and the permutation a associated with $\beta'$, such that:

$(C', id) * (\beta', \sigma) = (C'M', \sigma)$

By applying E-multiplication on the pairs (C', id) and ($(\beta', \sigma)$, an ordered pair (C'M', $\sigma$), may be generated and may serve as second ephemeral private key 119 for device 110. First ephemeral private key 117 and second ephemeral private key 119 may each be an ordered pair including respective secret element 240 (denoted here as C), 242 (denoted here as C'). Device 110 may store first ephemeral private key 117 and second ephemeral private key 119 in memory 114. In some examples, a search space for ephemeral private key 117 and ephemeral private key 119 may be chosen, or specified, by trusted third party device 210, to be sufficiently large to render the implementation of system 100 secure.

Device 110 may execute shared secret instruction 121 to determine an element 220 (denoted as Y) and an element 222 (denoted as Y'), where elements 220, 222 may each be a matrix. In an example, determination of element 220 and element 222 may include evaluating the E-multiplication based on the T-values stored in memory 114. For example, algebraic eraser module 102 may execute algebraic eraser instruction 104 to apply E-multiplication on secret element 240 (C), public key 127, the expression $\beta$ in the first set of conjugates, and the permutation a associated with β to determine an ordered pair 230 as follows:

$$(C\ C_D M_D, \sigma_D)^*(\beta,\sigma)=(Y,\sigma_D\sigma).$$

Device 110 may extract element 220 (Y) from ordered pair 230, which is denoted here as (Y, $\sigma_D\sigma$). Similarly, algebraic eraser module 102 may execute algebraic eraser instruction 104 to apply E-multiplication on secret element 242 (C'), public key 127, the expression β in the first set of conjugates, and the permutation a associated with β' to determine an ordered pair 232 as follows:

$$(C'C_D M_D, \sigma_D)^*(\beta,\sigma)=(Y,\sigma_D\sigma).$$

Device 110 may extract element 222 (Y') from ordered pair 232, which is denoted here as (Y', $\sigma_D\sigma$).

Device 110 may execute shared secret instruction 111 to determine element 150 ($V_1$) and element 152 ($V_2$) by applying a projection operator P on elements 220, 222, respectively. Projection operator P may project an input to a lower dimensional subspace of the input. For example, projection operator P may be applied on Y, such that P(Y)→lower dimensional subspace of Y. Device 110 may apply the projection operator P on elements 220, 222, such as:

$$V_1 = P(Y) = (n/2)^{th} \text{ column of the matrix } Y,$$

and $$V_2 = P(Y') = (n/2)^{th} \text{ column of the matrix } Y',$$

to determine elements 150, 152.

Device 110 may continue to execute shared secret instruction 111 to generate a pair:

$$(C'M'M^{-1}C^{-1}, V_1),$$

that may serve as session public key 155. Device 110 may send session public key 155 to device 120.

Device 120 may execute shared secret instruction 121 to derive, or determine, element 152 ($V_2$) based on the transmitted session public key 155 and secret element 129 as follows:

$$V_2 = C_D(C'M'M^{-1}C^{-1})C_D^{-1} \cdot V_1.$$

As a result, device 110 and device 120 may both have access to element 152 ($V_2$) because device 110 generated $V_2$, and device 120 determined $V_2$. In some examples, device 110 and device 120 may each apply hash instruction 108, such as a cryptographic hash function, to hash element 152 in order to produce shared secret data 180. In some examples, a nonce and a Message Authentication Code (MAC) may be used to verify both devices 110, 120 have a same session key (e.g., session public key 155).

Among other benefits, using a system in accordance with this disclosure, a first device, for example a home device HD in an MKAAP, and a second device, for example a device $D_i$ in an MKAAP, may produce a same secret message based on an exchange of public data such as public keys over an open communication channel. Further, the system in accordance with this disclosure may have the first device apply a particular instruction on the exchanged public data, but the second device may not be required to execute that particular instruction on any data in order to produce the secret message. The private key of the second device, which may be provided by a trusted third party, may not be known to the first device. For example, the trusted third party may send provide a private key designated for the second device by sending the private key to the second device through a private channel. As a result of the trusted third party transmitting the private key of the second device through the private channel, the first device, or other devices different from the second device, may not be able to obtain the private key. Similarly, the private key of the first device may be ephemeral or may be provided by the trusted third party through a private channel, and may not be known to the second device or other devices different from the first device. The first device may authenticate its public key by transmitting a signed certificate along with its public key. The public key of the second device may not need authentication. In an example, an attacker garnering data over a public channel may not feasibly obtain shared secret because if one of the devices, such as the second device, is compromised, only the security of the compromised device is breached, and other devices (including the home device) may remain secure.

Figure 3:
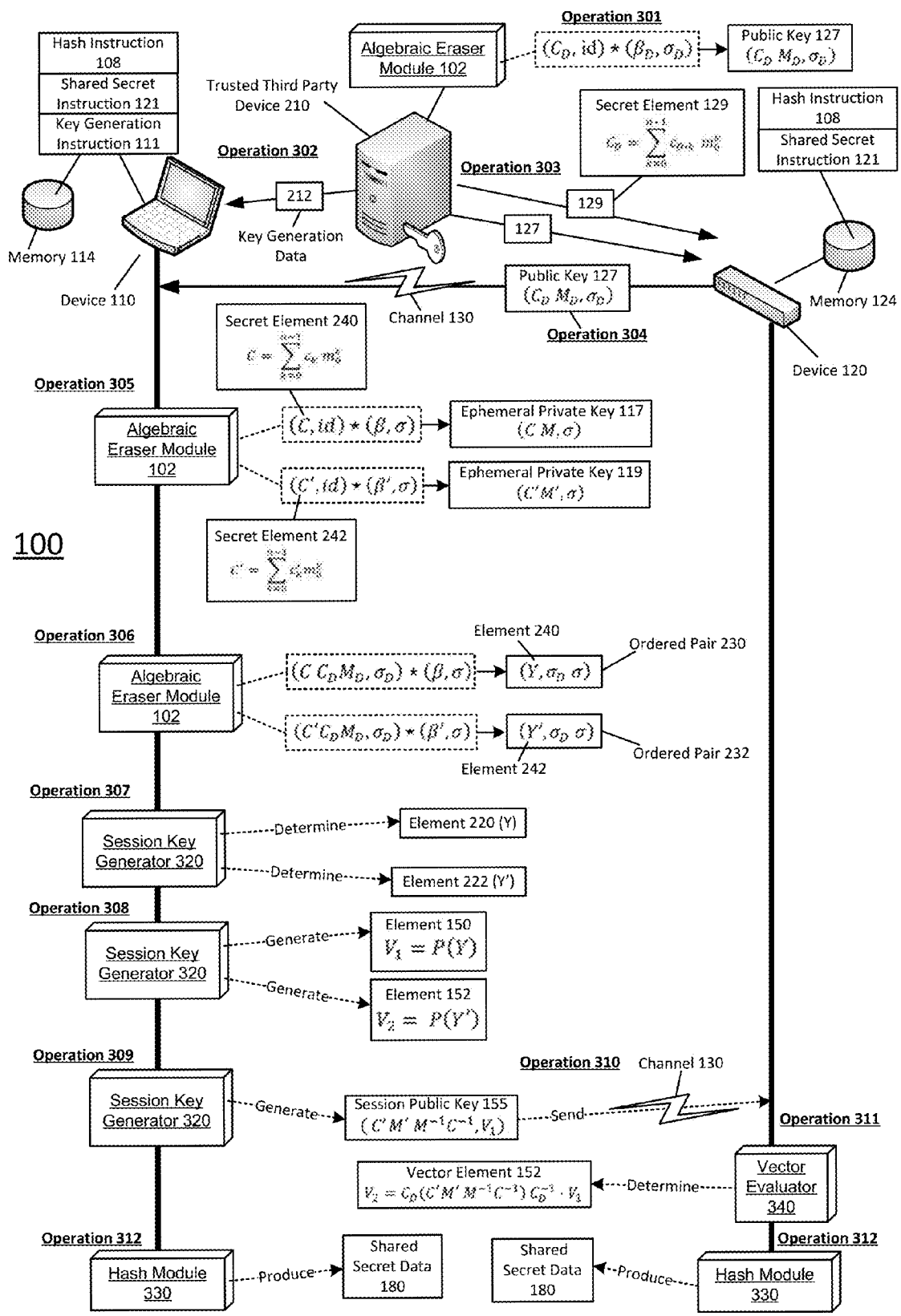
FIG. 3 illustrates an example process to implement a shared secret data production system.

FIG. 3 illustrates an example process to implement a shared secret data production system, arranged in accordance with at least some embodiments described herein. The process in FIG. 3 could be implemented using, for example, system 100 discussed above. Those components in FIG. 3 that are labelled identically to components of FIGS. 1-2 will not be described again for the purposes of clarity.

As shown in FIG. 3, an example process to implement system 100 may include operations 301, 302, 303, 304, 305, 306, 307, 308, 309, 310, 311, and 312. The operations to implement system 100 may be performed by one or more components or modules of trusted third party device 210, device 110 and device 120. In the example, trusted third party device 210 may include algebraic eraser module 102. In the example, device 110 may include algebraic eraser module 102, a session key generator 320, and a hash module 330, configured to be in communication with each other, and with memory 114 of device 110. In the example, device 120 may include hash module 330 and a vector evaluator 340 configured to be in communication with each other, and with memory 124 of device 120.

The example process may begin at operation 301, where algebraic eraser module 102 of trusted third party device 210 may derive public key 127 based on secret element 129. For example, algebraic eraser module 102 of trusted third party device 210 may execute E-multiplication on the pairs ($C_D$, id) and ($\beta_D$, $\sigma_D$) to determine an ordered pair ($C_D M_D$, $\sigma_D$), where the ordered pair ($C_D M_D$, $\sigma_D$) may serve as public key 127.

The example process may proceed from operation 301 to operation 302. At operation 302, trusted third party device 210 may send key generation data 212 to device 110. Key generation data 212 may include data indicating the braid group $B_n$ for a fixed even integer n, a finite field $F_q$ of q elements, a non-singular matrix $m_0 \in GL(n, F_q)$, a set of braid elements, $\alpha_i$, i=1, 2, . . . , r, and a fixed braid element z. In some examples, key generation data 212 may be received by a receiver of device 110, where the receiver of device 110 may receive electromagnetic waves relating to pieces of data, and may convert the received electromagnetic waves into the pieces of data, such as key generation data 212.

The example process may proceed from operation 302 to operation 303. At operation 303, trusted party device 210 may send public key 127 and secret element 129 to device 120. In some examples, trusted third party device 210 may sent public key 127 and secret element 129 to device 120 separately. Device 120 may receive secret element 129 from trusted third party device 210, and may store secret element 129 in a secured layer of memory 124. Device 120 may receive public key 127 from trusted third party device 210, and may store public key 127 in memory 124. In some examples, public key 127 and secret element 129 may be received by a receiver of device 120, where the receiver of device 120 may receive electromagnetic waves relating to pieces of data, and may convert the received electromagnetic waves into the pieces of data, such as public key 127 and secret element 129. In some examples, trusted third party device 210 may send public key 127 and secret element 129 to device 120 through a private channel, such that device 110 may not obtain secret element 129. The receiver of device 120 may identify that secret element 129 is sent through a private channel and, in response, may store secret element 129 in a secured layer of memory 124.

The example process may proceed from operation 303 to operation 304. At operation 304, device 120 may send public key 127 to device 110 through a public channel, such as channel 130. In some examples, a transmitter of device 120 may convert data relating to public key 127 into electromagnetic waves, and transmit the electromagnetic waves to the receiver of device 110 such that public key 127 may be received by the receiver of device 110.

The example process may proceed from operation 304 to operation 305. At operation 305, device 110 may determine secret element 240 and secret element 242. Secret element 240 and secret element 242 may not be known, or may be unobtainable, to device 120. Algebraic eraser module 102 may execute algebraic eraser instruction 104 to generate first ephemeral private key 117 and second ephemeral private key 119 based on secret elements 240, 242, respectively. Device 110 may store secret elements 240, 242 in a secured layer of memory 114.

The example process may proceed from operation 305 to operation 306. At operation 306, algebraic eraser module 102 may execute algebraic eraser instruction 104 to determine an ordered pair 230 based on public key 127 and first ephemeral private key 117. Similarly, algebraic eraser module 102 may execute algebraic eraser instruction 104 to determine an ordered pair 232 based on public key 127 and second ephemeral private key 119.

The example process may proceed from operation 306 to operation 307. At operation 307, session key generator 320 may execute shared secret instruction 121 to determine elements 220, 222, based on ordered pairs 230, 232. For example, session key generator 320 may extract element 220 from ordered pair 230 and may extract element 222 from ordered pair 232.

The example process may proceed from operation 307 to operation 308. At operation 308, session key generator 320 may determine elements 150, 152, based on elements 220, 222, respectively. For example, session key generator 320 may apply a projection operator P on elements 220, 222 to generate elements 150, 152, respectively.

The example process may proceed from operation 308 to operation 309. At operation 309, session key generator 320 may execute shared secret instruction 121 to generate session public key 155 based on first ephemeral private key 117, second ephemeral private key 119, and element 150.

The example process may proceed from operation 309 to operation 310. At operation 310, device 110 may send session public key 155 to device 120 through channel 130. In some examples, a transmitter of device 110 may convert data relating to session public key 155 into electromagnetic waves, and transmit the electromagnetic waves to the receiver of device 120 such that session public key 155 may be received by the receiver of device 120.

The example process may proceed from operation 310 to operation 311. At operation 311, vector evaluator 340 of device 120 may execute shared secret instruction 121 to derive, or determine, element 152 based on session public key 155.

The example process may proceed from operation 311 to operation 312. At operation 312, hash modules 330 of device 110 and device 120 may each execute hash instruction 108 to apply a cryptographic hash function on element 152 to produce shared secret data 180.

Figure 4:
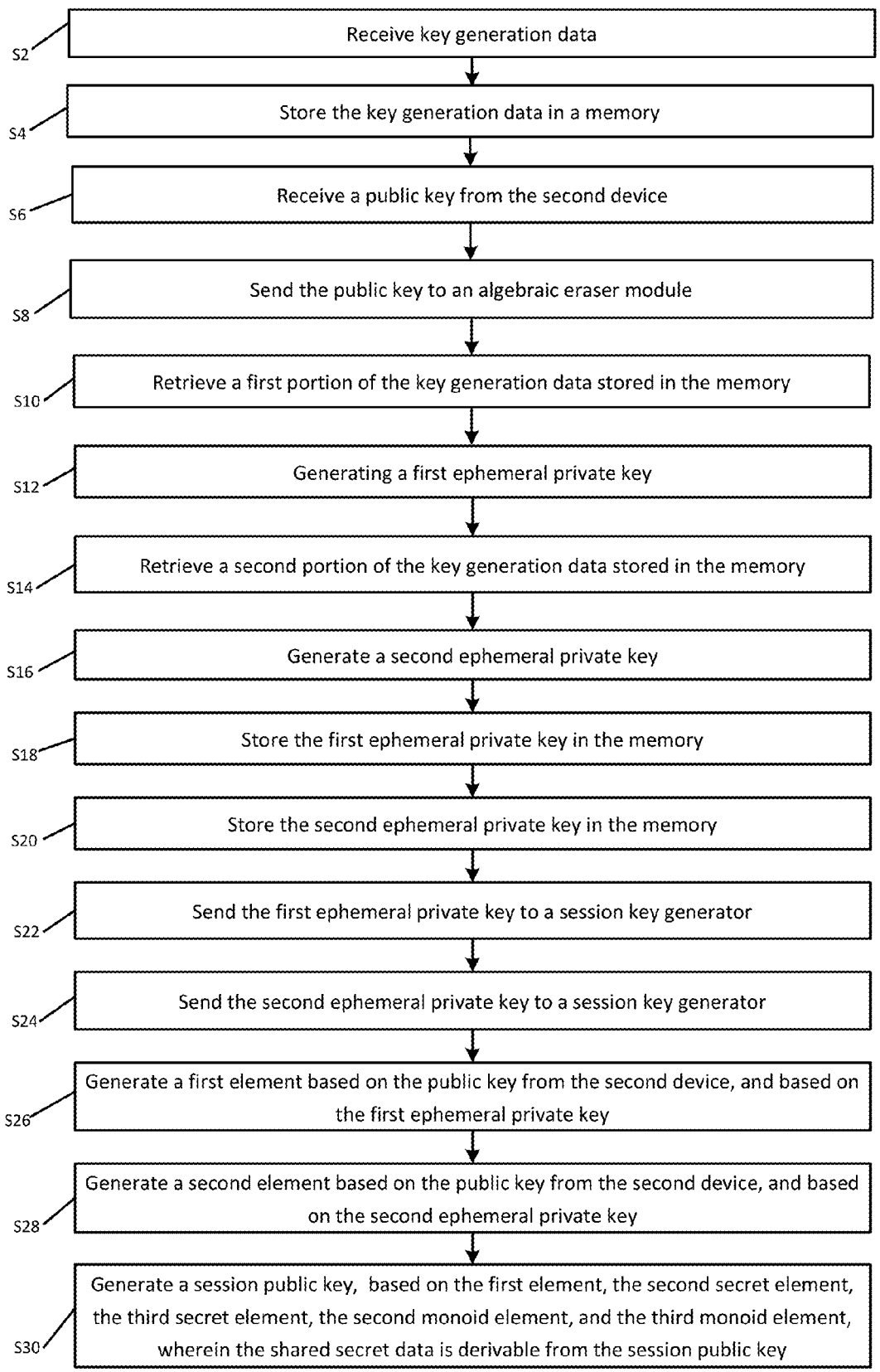
FIG. 4 illustrates a flow diagram for an example process to implement a shared secret data production system.

FIG. 4 illustrates a flow diagram for an example process to implement a shared secret data production system, arranged in accordance with at least some embodiments described herein. The process in FIG. 4 could be implemented using, for example, system 100 discussed above. An example process may include one or more operations, actions, or functions as illustrated by one or more of blocks S2, S4, S6, S8, S10, S12, S14, S16, S18, S20, S22, S24, S26, S28, and/or S30. Although illustrated as discrete blocks, various blocks may be divided into additional blocks, combined into fewer blocks, or eliminated, depending on the desired implementation.

The process may begin at block S2, "Receive key generation data". At block S2, A receiver of a first device may receive key generation data. The key generation data may be effective to indicate a braid group, a first set of conjugates included in the braid group, a non-singular matrix, and a set of invertible elements among a finite field. In some examples, the braid group may be a braid group with Artin generators.

The process may continue from block S2 to block S4, "Store the key generation data in a memory". At block S4, the receiver of the first device may store the key generation data in a memory of the first device.

The process may continue from block S4 to block S6, "Receive a public key from the second device". At block S6, the receiver of a first device may receive a public key from a second device. The public key may be based on a first secret element, a first monoid element, and a first permutation associated with a first expression in a second set of conjugates included in the braid group, where the second set of conjugates commutes with the first set of conjugates. In some examples, the receiver of the first device may receive the public key from the second device through a public channel.

The process may continue from block S6 to block S8, "Send the public key to an algebraic eraser module". At block S8, the receiver of the first device may send the public key to an algebraic eraser module of the first device.

The process may continue from block S8 to block S10, "Retrieve a first portion of the key generation data stored in the memory". At block S10, the algebraic eraser module of the first device may retrieve a first portion of the key generation data stored in the memory. The first portion of the key generation data may indicate a second expression in the first set of conjugates.

The process may continue from block S10 to block S12, "Generating a first ephemeral private key". At block S12, the algebraic eraser module of the first device may generate a first ephemeral private key based on a second secret element, the second expression in the first set of conjugates, and a second permutation associated with the second expression in the first set of conjugates. The first ephemeral private key may be based on the second secret element, a second monoid element, and the second permutation.

The process may continue from block S12 to block S14, "Retrieve a second portion of the key generation data stored in the memory". At block S14, the algebraic eraser module of the first device may retrieve a second portion of the key generation data stored in the memory. The second portion of the key generation data may indicate a third expression in the first set of conjugates.

The process may continue from block S14 to block S16, "Generate a second ephemeral private key". At block S16, the algebraic eraser module of the first device may generate a second ephemeral private key based on a third secret element, the third expression in the first set of conjugates, and the second permutation associated with the third expression in the first set of conjugates. The second ephemeral private key may be based on the third secret element, a third monoid element, and the second permutation.

The process may continue from block S16 to block S18, "Store the first ephemeral private key in the memory". At block S18, the algebraic eraser module of the first device may store the first ephemeral private key in the memory of the first device.

The process may continue from block S18 to block S20, "Store the second ephemeral private key in the memory". At block S20, the algebraic eraser module of the first device may store the second ephemeral private key in the memory of the first device.

The process may continue from block S20 to block S22, "Send the first ephemeral private key to a session key generator". At block S22, the algebraic eraser module of the first device may send the first ephemeral private key to a session key generator of the first device.

The process may continue from block S22 to block S24, "Send the second ephemeral private key to a session key generator". At block S24, the algebraic eraser module of the first device may send the second ephemeral private key to the session key generator of the first device.

The process may continue from block S24 to block S26, "Generate a first element based on the public key from the second device, and based on the first ephemeral private key". At block S26, the session key generator first device may generate a first element based on the public key from the second device, and based on the first ephemeral private key.

The process may continue from block S26 to block S28, "Generate a second element based on the public key from the second device, and based on the second ephemeral private key". At block S28, the session key generator the first device may generate a second element based on the public key from the second device, and based on the second ephemeral private key, wherein the second element relates to the shared secret data.

The process may continue from block S28 to block S30, "Generate a session public key, based on the first element, the second secret element, the third secret element, the second monoid element, and the third monoid element, wherein the shared secret data is derivable from the session public key". At block S30, the session key generator of the first device may generate a session public key based on the first element, the second secret element, the third secret element, the second monoid element, and the third monoid element. The shared secret data may be derivable from the session public key. In some examples, a transmitter of the first device may send the session public key to the second device such that the second device may derive the shared secret data based on the session public key.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A method for producing shared secret data between a first device and a second device, the method comprising:
receiving, by a receiver of the first device, key generation data that is effective to indicate a braid group, a first set of conjugates included in the braid group, a non-singular matrix, and a set of invertible elements among a finite field;
storing, by the receiver of the first device, the key generation data in a memory of the first device;
receiving, by the receiver of a first device, a public key from the second device, wherein the public key is based on a first secret element, a first monoid element, and a first permutation associated with a first expression in a second set of conjugates included in the braid group, wherein the second set of conjugates commutes with the first set of conjugates;
sending, by the receiver of the first device, the public key to an algebraic eraser module of the first device;
retrieving, by the algebraic eraser module of the first device, a first portion of the key generation data stored in the memory, wherein the first portion of the key generation data indicates a second expression in the first set of conjugates;
generating, by the algebraic eraser module of the first device, a first ephemeral private key based on:
a second secret element,
the second expression in the first set of conjugates, and
a second permutation associated with the second expression in the first set of conjugates, wherein the first ephemeral private key is based on the second secret element, a second monoid element, and the second permutation;
retrieving, by the algebraic eraser module of the first device, a second portion of the key generation data stored in the memory, wherein the second portion of the key generation data indicates a third expression in the first set of conjugates;
generating, by the algebraic eraser module of the first device, a second ephemeral private key based on:
a third secret element,
the third expression in the first set of conjugates, and
the second permutation associated with the third expression in the first set of conjugates, wherein the second ephemeral private key is based on the third secret element, a third monoid element, and the second permutation;
storing, by the algebraic eraser module of the first device, the first ephemeral private key in the memory of the first device;
storing, by the algebraic eraser module of the first device, the second ephemeral private key in the memory of the first device;
sending, by the algebraic eraser module of the first device, the first ephemeral private key to a session key generator of the first device;
sending, by the algebraic eraser module of the first device, the second ephemeral private key to the session key generator of the first device;
generating, by the session key generator first device, a first element based on the public key from the second device, and based on the first ephemeral private key;
generating, by the session key generator the first device, a second element based on the public key from the second device, and based on the second ephemeral private key, wherein the second element relates to the shared secret data; and generating, by the session key generator of the first device, a session public key based on the first element, the second secret element, the third secret element, the second monoid element, and the third monoid element, wherein the shared secret data is derivable from the session public key.

2. The method of claim 1, wherein receiving the public key includes receiving, by the receiver of the first device, the public key from the second device through a public channel of a network.

3. The method of claim 1, further comprising sending, by a transmitter of the first device, the session public key to the second device through a public channel of the network.

4. The method of claim 3, further comprising, in response to sending the session public key to the second device:
removing, by a processor of the first device, the first ephemeral key from the memory of the first device; and
removing, by a processor of the first device, the second ephemeral key from the memory of the first device.

5. The method of claim 3, further comprising:
determining a lapse of time from a sending time of the session public key from the first device to the second device;
comparing the lapse of time with a threshold;
in response to the lapse of time being equal to or greater than the threshold:
removing, by a processor of the first device, the first ephemeral key from the memory of the first device; and
removing, by a processor of the first device, the second ephemeral key from the memory of the first device.

6. The method of claim 1, wherein:
generating, by the algebraic eraser module of the first device, the first ephemeral private key includes applying, by the algebraic eraser module of the first device, a one-way function on:
the second secret element,
an identity permutation,
the second expression in the first set of conjugates, and
the second permutation associated with the second expression; and
generating, by the algebraic eraser module of the first device, the second ephemeral private key includes applying, by the algebraic eraser module of the first device, the one-way function on:
the third secret element,
the identity permutation,
the third expression in the first set of conjugates, and
the second permutation associated with the third expression.

7. The method of claim 1, wherein:
generating the first element includes:
applying, by the algebraic eraser module of the first device, a one-way function on:
the public key,
the second secret element,
the second permutation, and
the second expression in the first set of conjugates to determine a third element;
sending, by the algebraic eraser module of the first device, the third element to the session key generator of the first device; and
applying, by the session key generator of the first device, a projection operator on the third element to generate the first element; and generating the second element includes:
applying, by the algebraic eraser module of the first device, the one-way function on:
the public key,
the third secret element,
the second permutation, and
the third expression in the first conjugates to determine a fourth element;
sending, by the algebraic eraser module of the first device, the fourth element to the session key generator of the first device; and
applying, by the session key generator of the first device, the projection operator on the fourth element to generate the second element.

8. The method of claim 1 further comprising:
prior to generating the first ephemeral key, determining, by the algebraic eraser module of the first device, the second secret element based on the non-singular matrix and the set of invertible elements among the finite field; and
prior to generating the second ephemeral key, determining, by the algebraic eraser module of the first device, the third secret element based on the non-singular matrix and the set of invertible elements among the finite field.

9. The method of claim 1, wherein the braid group is a braid group with Artin generators.

10. The method of claim 1, further comprising applying, by a hash module of the first device, a cryptographic hash function on the second element to produce the shared secret data.

11. A system effective to produce shared secret data, the system comprising:
a first device including a first memory; and
a second device including a second memory;
the first device being configured to:
receive key generation data from a third device, wherein the key generation data is effective to indicate a braid group, a first set of conjugates included in the braid group, a non-singular matrix, and a set of invertible elements among a finite field;
store the key generation data in the first memory;
the second device being configured to:
receive a first secret element from the third device;
receive a public key from the third device, wherein the public key is based on the first secret element, a first monoid element, and a first permutation associated with a first expression in a second set of conjugates included in the braid group, wherein the second set of conjugates commutes with the first set of conjugates;
store the first secret element in the second memory of the second device; and
send the public key to the first device;
the first device being further configured to:
generate a first ephemeral private key based on:
a second secret element,
a second expression in the first set of conjugates, and
a second permutation associated with the second expression in the first set of conjugates, wherein the first ephemeral private key is based on the second secret element, a second monoid element, and the second permutation;
generate a second ephemeral private key based on:
a third secret element,
a third expression in the first set of conjugates, and the second permutation associated with the third expression in the first set of conjugates, wherein the second ephemeral private key is based on the third secret element, a third monoid element, and the second permutation;

store the first ephemeral private key in the first memory of the first device;

store the second ephemeral private key in the first memory of the first device;

generate a first element based on the public key received from the second device, and based on the first ephemeral private key;

generate a second element based on the public key received from the second device, and based on the second ephemeral private key, wherein the second element relates to the shared secret data; and generate a session public key based on the first element, the second secret element, the third secret element, the second monoid element, and the third monoid element, wherein the session public key is specified for one or more communication sessions between the first device and the second device; and send the session public key to the second device;

the second device being further configured to:

receive the session public key from the first device;

determine the second element based on the first secret element and the session public key to produce the shared secret data.

12. The system of claim 11, wherein the first device is further configured to:

determine the second secret element based on the non-singular matrix and the set of invertible elements among the finite field; and determine the third secret element based on the non-singular matrix and the set of invertible elements among the finite field.

13. The system of claim 11, further comprising the third device, wherein the third device is configured to be in communication with the first device, and with the second device, through the network, and the third device being configured to:

send the key generation data to the first device;

determine the first secret element based on the non-singular matrix and the set of invertible elements among the finite field;

send the first secret element to the second device;

generate the public key; and send the public key to the second device.

14. The system of claim 11, wherein the first device is further configured to:

apply a one-way function on:
the second secret element,
an identity permutation,
the second expression in the first set of conjugates, and
the second permutation associated with the second expression to generate the first ephemeral private key; and apply the one-way function on:
the third secret element,
the identity permutation,
the third expression in the first set of conjugates, and
the second permutation associated with the third expression to generate the second ephemeral private key.

15. The system of claim 11, wherein the first device is further configured to:

apply a one-way function on:
the public key,
the second secret element,
the second permutation, and
the second expression in the first set of conjugates to determine a third element;

apply the one-way function on:
the public key,
the third secret element,
the second permutation, and
the third expression in the first set of conjugates to determine a fourth element;

send the third element and the fourth element to the session key generator of the second device;

wherein the session key generator of the second device is further configured to:

apply a projection operator on the third element to generate the first element; and apply the projection operator on the fourth element to generate the second element.

16. The system of claim 11, wherein the braid group is a braid group with Artin generators.

17. The system of claim 11, wherein the first device and the second device are configured to be in communication through a public channel.

18. The system of claim 11, wherein the first device is further configured to receive a certificate digitally signed by the third device, and the digitally signed certificate includes the public key.

19. A first device effective to produce shared secret data, the device comprising:

a memory;

a receiver configured to be in communication with the memory;

an algebraic eraser module configured to be in communication with the memory and the receiver;

a session key generator configured to be in communication with the memory, the receiver, and the algebraic eraser module; and the receiver being configured to:

receive key generation data from a third device;

store the key generation data in the memory, wherein the key generation data is effective to indicate a braid group, a first set of conjugates included in the braid group, a non-singular matrix, and a set of invertible elements among a finite field;

receive a public key from a second device, wherein the public key is based on a first secret element, a first monoid element, and a first permutation associated with a first expression in a second set of conjugates included in the braid group, wherein the second set of conjugates commutes with the first set of conjugates;

send the received public key to the algebraic eraser module;

the algebraic eraser module being configured to:

retrieve a first portion of the key generation data stored in the memory, wherein the first portion of the key generation data indicates a second expression in the first set of conjugates;

generate a first ephemeral private key based on:
a second secret element,
the second expression in the first set of conjugates, and
a second permutation associated with the second expression in the first set of conjugates, wherein the first ephemeral private key is based on the second secret element, a second monoid element, and the second permutation;
retrieve a second portion of the key generation data stored in the memory, wherein the second portion of the key generation data indicates a third expression in the first set of conjugates;
generate a second ephemeral private key based on:
a third secret element,
the third expression in the first set of conjugates, and
the second permutation associated with the third expression in the first set of conjugates, wherein the second ephemeral private key is based on the third secret element, a third monoid element, and the second permutation;
store the first ephemeral private key in the memory of the first device;
store the second ephemeral private key in the memory of the first device;
send the first ephemeral private key to the session key generator;
send the second ephemeral private key to the session key generator;

the session key generator being configured to:
generate a first element based on the public key received from the second device, and based on the first ephemeral private key;
generate a second element based on the public key received from the second device, and based on the second ephemeral private key, wherein the second element relates to the shared secret data; and
generate a session public key based on the first element, the second secret element, the third secret element, the second monoid element, and the third monoid element, wherein the shared secret data is derivable from the session public key.

20. The first device of claim 19, further comprising a transmitter configured to be in communication with the memory, the receiver, the algebraic eraser module, and the session key generator, the transmitter is further configured to send the session public key to the second device to facilitate the production of the shared secret data by the second device.

* * * * *